UNITED STATES PATENT OFFICE.

EUGENE S. POWERS, OF MERCHANTVILLE, NEW JERSEY.

PROCESS OF TREATING CLAY.

No. 818,287. Specification of Letters Patent. Patented April 17, 1906.

Application filed July 10, 1905. Serial No. 269,082.

*To all whom it may concern:*

Be it known that I, EUGENE S. POWERS, a citizen of the United States, residing at Merchantville, in the county of Camden and State of New Jersey, have invented new and useful Improvements in Processes of Treating Clay, of which the following is a specification.

My invention relates to an improved process of treating clay in the manufacture of building materials and similar products, and more particularly to that part of the process relating to drying and setting or hardening the plastic forms.

The principal objects of the invention are to provide a process by which the shrinkage of clays while drying and hardening from a moist and plastic state may be prevented, thus obviating its cracking and separating and enabling same to be molded or formed in solid layers in connection with metal or other reinforcing frames in building construction and other uses without separating or drawing away from such frames.

A further object of the invention is to provide a process for the manufacture of clay products having a hard and insoluble surface with a smooth finish and for other purposes hereinafter disclosed, and particularly pointed out in the claims.

In working the process constituting my invention pure clay or clay mixed with sand and tempered to the preferred degrees for the purposes for which designed are incorporated with an aqueous solution of an inorganic substance that has an affinity for oxygen or carbonic anhydrid. I have found that silica (silica anhydrid $SiO_2$) may be successfully used for this purpose, as found in the form of sand or quartz. Such silicious substances may be reduced to a solution by any known method; but such reduction can be effectively and economically accomplished for the said purposes by finely dividing the silica and boiling same in water with potassium or sodium hydroxid or by boiling a fusion of silica with sodium or potassium hydroxid or carbonate. Such a solution of silica produces what is commonly known as "water-glass."

Ordinary commercial sodium silicate of the consistency of thin mucilage may be employed when desired or when impracticable to reduce silica to a solution, as above described.

Any satisfactory method of mixing the component ingredients may be employed, and the particular proportions thereof may be varied within certain limits. In the preferred operation of the mixing step four parts of clay and eight parts of fine dry sand are placed into a mixing-machine and therein thoroughly intermixed. The sand should be free from large stones and pebbles and the clay previously dried and pulverized and sifted through a fine screen of about one sixty-fourth of an inch mesh. During this operation of mixing one part of the solution of silica or the commercial sodium silicate diluted with three parts of water is added by a sprinkler or otherwise and incorporated with the dry composition and the whole mass thoroughly kneaded until the ingredients are uniformly and evenly intermixed and the admixture reduced to a plastic state suitable for plastering walls or molding into blocks or the desired forms.

The particular type of the mixing-machine is unimportant, any of the well-known constructions serving the purpose, such as a tube-mill or pebble-mill. Coloring-matter may be supplied to the admixture by dissolving same in the aqueous solution of silica prior to its incorporation with the clay and sand in the mixing-machine. The composition having thus been prepared for use may be kept in a plastic state for an indefinite time by protecting it from the air with wet cloths or otherwise.

After such plastic composition has been molded or applied as plaster to walls an oxid may be formed on the exposed surface thereof by subjecting same to the action of oxygen applied thereto. This may be accomplished by being exposed to the atmosphere or by blasts of air being directed against the surface of the composition. The oxid thus formed on the surface of the composition may be changed to a hard, insoluble, and non-fusible crust by subjecting same to a temperature of about 400° Fahrenheit. Sufficient heat may be obtained to produce such crust by passing a flame, preferably smokeless, over its surface.

It will be appreciated that the immediate formation of an oxid or crystallized surface on the composition after being molded or applied to a wall when exposed to the atmosphere prevents its shrinkage or contraction when the moisture contained therein evaporates.

The means for carrying out the herein-described invention will be readily understood upon reference to the foregoing description; but it will be appreciated that the methods may be varied from the specific exemplification thereof described without departing from the spirit and scope of the invention.

Having thus described my invention, what I claim as new, and desire to be protected by Letters Patent, is—

1. The herein-described process of making plastic products, consisting in incorporating with clay a liquid solution of silica, or similar inorganic substance, molding same, and thereafter causing the crystallization of said silica on the surface of the composition.

2. The herein-described process of making plastic products, consisting in mixing clay and sand, adding liquid solution of silica, molding same, and thereafter causing the crystallization of said solution of silica on the surface of the composition.

3. The process of making plastic products, consisting in incorporating with clay a liquid solution of silica, molding same, and thereafter causing the formation of a crystallized crust on the surface of the composition to prevent the shrinkage or contraction thereof, substantially as described.

4. The process of making plastic products, consisting in mixing clay and sand, adding and mixing liquid solution of silica, molding such composition, then exposing same to the atmosphere, and thereafter heating whereby the exposed surface forms a crystallized crust, substantially as described.

5. The process of making plastic products, consisting in mixing clay and sand, adding and mixing liquid solution of silica, molding such composition, then causing the formation of an oxid on the exposed surface thereof, and thereafter heating same whereby the oxid forms a crystallized crust, substantially as described.

In testimony whereof I have signed my name to this specification in the presence of two subscribing witnesses.

EUGENE S. POWERS.

Witnesses:
   S. ALBERT CLOUD,
   JOHN MOLITOR.